United States Patent
Minami

(10) Patent No.: US 9,709,453 B2
(45) Date of Patent: Jul. 18, 2017

(54) PRESSURE SENSOR AND METHOD FOR MANUFACTURING THE SAME

(71) Applicant: TOKYO ELECTRON LIMITED, Tokyo (JP)

(72) Inventor: Tomohide Minami, Miyagi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 225 days.

(21) Appl. No.: 14/734,043

(22) Filed: Jun. 9, 2015

(65) Prior Publication Data

US 2015/0377735 A1 Dec. 31, 2015

(30) Foreign Application Priority Data

Jun. 27, 2014 (JP) .................................. 2014-133255

(51) Int. Cl.
*G01L 21/12* (2006.01)

(52) U.S. Cl.
CPC .................... *G01L 21/12* (2013.01)

(58) Field of Classification Search
CPC ........................... G01L 21/12; C23C 14/5873
See application file for complete search history.

(56) References Cited

U.S. PATENT DOCUMENTS

| | | | |
|---|---|---|---|
| 2006/0249847 A1* | 11/2006 | Eriksen | C23C 14/021 257/751 |
| 2013/0233086 A1 | 9/2013 | Besling et al. | |
| 2013/0252417 A1* | 9/2013 | Ishizaka | C23C 14/025 438/643 |

FOREIGN PATENT DOCUMENTS

JP 2008-304463 A 12/2008

* cited by examiner

*Primary Examiner* — Nguyen Ha

(74) *Attorney, Agent, or Firm* — Rothwell, Figg, Ernst & Manbeck, P.C.

(57) ABSTRACT

Disclosed is a method for manufacturing a sensor module that generates heat through an electric resistor adapted to be exposed to a gas, and outputs a temperature change caused in the electric resistor according to a pressure of the gas, as a resistance change of the electric resistor. The method includes: forming an insulation layer on a substrate in which the insulation layer is an oxide film or a nitride film; and forming a conductor layer on the insulation layer under a temperature condition of 300° C. to 600° C., in which the conductor layer serves as the electric resistor.

6 Claims, 10 Drawing Sheets

PRESSURE SENSOR AND METHOD FOR MANUFACTURING THE SAME

CROSS-REFERENCE TO RELATED APPLICATIONS

This application is based on and claims priority from Japanese Patent Application No. 2014-133255, filed on Jun. 27, 2014, with the Japan Patent Office, the disclosure of which is incorporated herein in its entirety by reference.

TECHNICAL FIELD

Various aspects and exemplary embodiments of the present disclosure are related to a pressure sensor and a method for manufacturing the same.

BACKGROUND

A Pirani vacuum gauge is known as a device for measuring a pressure of a gas. The Pirani vacuum gauge is provided with, for example, a filament (an electric resistor) formed of a fine metal wire, and configured to measure a pressure of a gas based on a quantity of heat loss of the filament which is caused due to heat exchange between the filament and the gas. In addition, with the recent advancement in a micro-electro mechanical system (MEMS) technology, the miniaturization of the pressure sensor using the principle of the Pirani vacuum gauge has progressed. See, for example, Japanese Patent Laid-Open Publication No. 2008-304463 and U.S. Patent Application Publication No. 2013/0233086.

SUMMARY

An aspect of the present disclosure provides a method for manufacturing a pressure sensor that generates heat through an electric resistor adapted to be exposed to a gas, and outputs a temperature change caused in the electric resistor according to a pressure of the gas, as a resistance change of the electric resistor. The method includes: forming a first film on a substrate, in which the first film is an oxide film or a nitride film; and forming a second film on the first film under a temperature condition of 300° C. to 600° C., in which the second film serves as the electric resistor.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
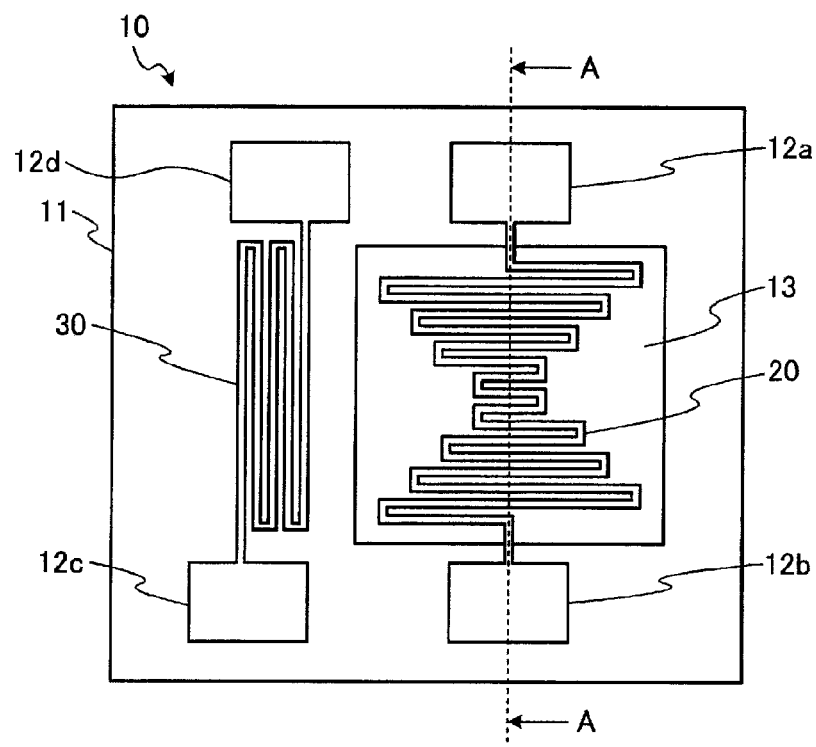
FIG. 1 is a plan view illustrating an exemplary sensor module according to an exemplary embodiment.

In the following detailed description, reference is made to the accompanying drawing, which form a part hereof. The illustrative embodiments described in the detailed description, drawing, and claims are not meant to be limiting. Other embodiments may be utilized, and other changes may be made without departing from the spirit or scope of the subject matter presented here.

When the pressure sensor using the principle of the Pirani vacuum gauge is manufactured through the MEMS technology, a metal film is formed on a substrate, and the metal film is etched into a predetermined pattern to form a fine metal wire that becomes an electric resistor that exchanges heat with a gas. The metal film is generally formed on the substrate through a normal-temperature sputtering.

The metal film formed through the normal-temperature sputtering has a low deposition temperature. Thus, a metal atom that has reached the substrate hardly grows into a crystal nucleus. Thus, the metal film formed through the normal-temperature sputtering becomes a film that has small crystals and a lot of voids. In addition, when a current is input to the fine metal wire formed by etching the metal film formed through the normal-temperature sputtering, under a current condition with a high current density, the voids within the fine metal wire grow, and thus, a volume resistivity is changed.

In the Pirani vacuum gauge, a pressure of a gas is determined by detecting a temperature change caused in the electric resistor as a heat quantity is taken out by the gas, as a resistance change of the electric resistor. In order to increase the temperature change of the electric resistor, it is necessary to input a somewhat large current to the electric resistor so as to generate heat. However, when the fine metal wire formed from the metal film formed through the normal-temperature sputtering is used, the resistance of the fine metal wire is changed due to the current input to the metal wire so as to generate the heat. Thus, the precision of measuring the resistance change caused in the electric resistor as the heat quantity is taken out by the gas is degraded, and thus, the precision of measuring the pressure of the gas is also degraded.

In an aspect, there is provided a method for manufacturing a pressure sensor that generates heat through an electric resistor adapted to be exposed to a gas, and outputs a temperature change caused in the electric resistor according to a pressure of the gas, as a resistance change of the electric resistor. The method includes: forming a first film on a substrate, in which the first film is an oxide film or a nitride film; and forming a second film on the first film under a temperature condition of 300° C. to 600° C., in which the second film serves as the electric resistor.

In another aspect, there is provided a method for manufacturing a pressure sensor that generates heat through an electric resistor adapted to be exposed to a gas, and outputs a temperature change caused in the electric resistor according to a pressure of the gas, as a resistance change of the electric resistor. The method includes: forming a first film on a substrate, in which the first film is an oxide film or a nitride film; forming a second film on the first film under a temperature condition of 50° C. or less, in which the second film serves as the electric resistor; and performing an annealing treatment on the second film formed on the first film under a temperature condition of 600° C. to 1000° C.

In one exemplary embodiment of the method for manufacturing a pressure sensor disclosed herein, the second film may be formed of a metal containing platinum or nickel.

In another exemplary embodiment of the method for manufacturing a pressure sensor disclosed herein, the substrate may be formed of silicon, and the first film may be formed of silicon nitride.

In still another aspect, there is provided a pressure sensor that generates heat through an electric resistor adapted to be exposed to a gas, and outputs a temperature change caused in the electric resistor according to a pressure of the gas, as a resistance change of the electric resistor. The pressure sensor is manufactured by a manufacturing method including: forming a first film on a substrate, in which the first film is an oxide film or a nitride film; and forming a second film on the first film under a temperature condition of 300° C. to 600° C., in which the second film serves as the electric resistor.

In yet another aspect, there is provided a pressure sensor that generates heat through an electric resistor adapted to be exposed to a gas, and outputs a temperature change caused in the electric resistor according to a pressure of the gas, as a resistance change of the electric resistor. The pressure sensor is manufactured by a manufacturing method including: forming a first film on a substrate, in which the first film is an oxide film or a nitride film; forming a second film on the first film under a temperature condition of 50° C. or less, in which the second film serves as the electric resistor; and performing an annealing treatment on the second film formed on the first film under a temperature condition of 600° C. to 1000° C.

According to various aspects and exemplary embodiments of the present disclosure, a pressure sensor capable of measuring a pressure of a gas highly precisely and a method of manufacturing the same may be achieved.

Hereinafter, exemplary embodiments of a pressure sensor disclosed herein and a method of manufacturing the same will be described in detail with reference to the accompanying drawings. However, the present disclosure is not limited by the exemplary embodiments. In addition, respective exemplary embodiments may be combined with each other in a suitable manner without contradicting the processing contents.

First Exemplary Embodiment

Constitution of Sensor Module 10

Figure 2:
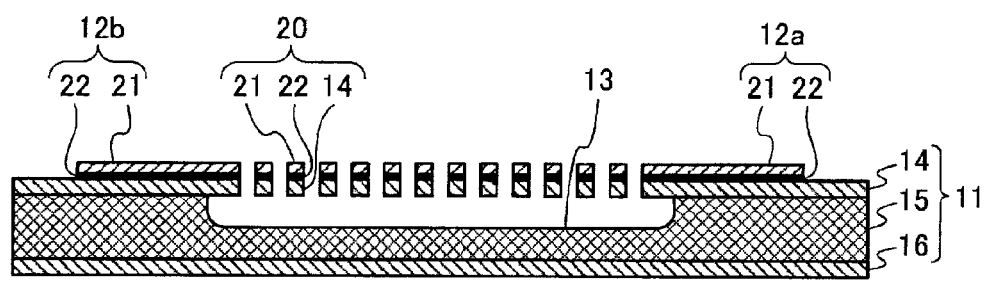
FIG. 2 is a cross-sectional view of the sensor module taken along line A-A in FIG. 1.

FIG. 1 is a plan view illustrating an exemplary sensor module 10 according to an exemplary embodiment. FIG. 2 is a cross-sectional view of the sensor module 10 taken along line A-A in FIG. 1. The sensor module 10 includes a substrate 11 including a recess 13 formed therein. On the substrate 11, a plurality of electrode pads 12a to 12d, an electric resistor 20, and a temperature compensation body 30 are formed. The sensor module 10 is an example of a pressure sensor.

For example, as illustrated in FIG. 2, the substrate 11 includes an insulation layer 14, an intermediate layer 15, and an insulation layer 16. The intermediate layer 15 is formed of, for example, silicon. In the present exemplary embodiment, the film thickness of the intermediate layer 15 is, for example, about 300 µm. The insulation layer 14 and the insulation layer 16 are formed of, for example, silicon nitride. In the present exemplary embodiment, the film thickness of each of the insulation layer 14 and the insulation layer 16 is, for example, about 200 nm. Meanwhile, the insulation layer 14 and the insulation layer 16 may be formed of silicon oxide.

The recess 13 is formed approximately in the vicinity of the center of the substrate 11 at the side of the surface on which the insulation layer 14 is formed. In the present exemplary embodiment, the opening of the recess 13 is formed in a rectangular shape, of which each side is, for example, about 250 µm, and the depth of the recess 13 is, for example, about 100 µm.

The electric resistor 20 is provided between the electrode pad 12a and the electrode pad 12b. One end of the electric resistor 20 is connected to the electrode pad 12a and the other end is connected to the electrode pad 12b. The electric resistor 20 generates heat according to the current input through the electrode pad 12a and the electrode pad 12b. For example, as illustrated in FIG. 2, the electric resistor 20 is supported by the electrode pad 12a and the electrode pad 12b, and spaced apart from the recess 13. As a result, the heat quantity transferred from the substrate 11 to the electric resistor 20 may be kept low so that the temperature change of the electric resistor 20 caused by the heat exchange with the gas may be detected highly precisely.

For example, as illustrated in FIG. 2, each of the electrode pads 12a and 12b includes a conductor layer 21 and an adhesive layer 22. In addition, for example, as illustrated in FIG. 2, the electric resistor 20 includes a conductor layer 21, an adhesive layer 22, and an insulation layer 14. In the present exemplary embodiment, the adhesive layer 22 in the electric resistor 20 is formed so as to bond the conductor layer 21 to the insulation layer 14. Thus, in the electric resistor 20, the conductor layer 21 mainly functions as the filament in the Pirani vacuum gauge.

The conductor layer 21 is formed of a material having a high temperature coefficient of resistance (TCR) such as, for example, platinum or nickel, in which the TCR refers to a change amount of an electric resistance per a unit temperature change. In addition, the conductor layer 21 may be also formed of chromium, silicon, molybdenum, nickel, titanium, tantalum, tungsten, or a quantum well material such as, for example, a conductive alloy, a mixed semiconductor material, or a silicon germanium (SiGe) single crystal. In the present exemplary embodiment, the film thickness of the conductor layer 21 is, for example, about 50 nm.

The adhesive layer 22 is formed of, for example, chromium or titanium. In the present exemplary embodiment, the film thickness of the adhesive layer 22 is, for example, about 5 nm.

As illustrated in FIG. 1, the electric resistor 20 may be formed, for example, in a meander shape in which the linear electric resistor 20 is bent multiple times in a direction different from the direction from the electrode pad 12a to the electrode pad 12b as the electric resistor 20 proceeds in the direction from the electrode pad 12a to the electrode pad 12b between the electrode pad 12a and the electrode pad 12b. Thus, the surface of the electric resistor 20 to be exposed to the gas may be increased so that the temperature change in the electric resistor 20 by heat exchange with the gas may be detected highly precisely.

Figure 3:
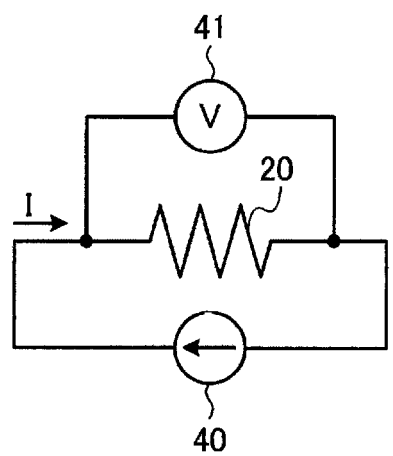
FIG. 3 is a circuit diagram illustrating an exemplary pressure measuring method.

Here, when the gas comes in contact with the electric resistor 20, the heat exchange is performed between the electric resistor 20 and the gas so that the temperature of the electric resistor 20 decreases. Since the resistance of the electric resistor 20 is temperature-dependent, the temperature of the electric resistor 20 may be measured as the resistance of the electric resistor 20. In addition, for example, as illustrated in FIG. 3, when a current is input to the electric resistor 20 from a current source 40, the resistance of the electric resistor 20 may be measured as the voltage drop across the electric resistor 20 by a voltmeter 41.

When the pressure of a gas is low, the heat quantity taken out by the gas from the electric resistor 20 is reduced, and thus, the decreasing amount of temperature of the electric resistor 20 is small. Meanwhile, when the pressure of a gas is high, the heat quantity taken out by the gas from the electric resistor 20 is increased, and thus, the decreasing amount of temperature of the electric resistor 20 is increased. Therefore, the pressure of the gas can be measured by measuring the resistance of the electric resistor 20 according to the temperature of the electric resistor 20.

Meanwhile, the present exemplary embodiment makes the current flowing in the electric resistor 20 constant, and determines the pressure of the gas from a change in the voltage drop across the electric resistor 20. The current supplied to the electric resistor 20 may be controlled to make the temperature of the electric resistor 20 constant, and the pressure of the gas may be determined from the current supplied to the electric resistor 20 at that time and the voltage drop across the electric resistor 20.

In the sensor module 10, a temperature compensation body 30 is provided between the electrode pad 12c and the electrode pad 12d, for example, as illustrated in FIG. 1. The temperature compensation body 30 is provided in order to compensate for the effect by the temperature change in the substrate 11. The temperature compensation body 30 is formed on the surface of the substrate 11 in the vicinity of the electric resistor 20. The temperature compensation body 30 is formed in a fine wire shape from the same material as the electric resistor 20. The temperature compensation body 30 is formed, for example, in a meander shape on the surface of the substrate 11. The temperature compensation body 30 is covered with a passivation layer such that the surface of the temperature compensation body 30 is not exposed to the gas.

Manufacturing Sequence of Sensor Module 10

Figure 4:
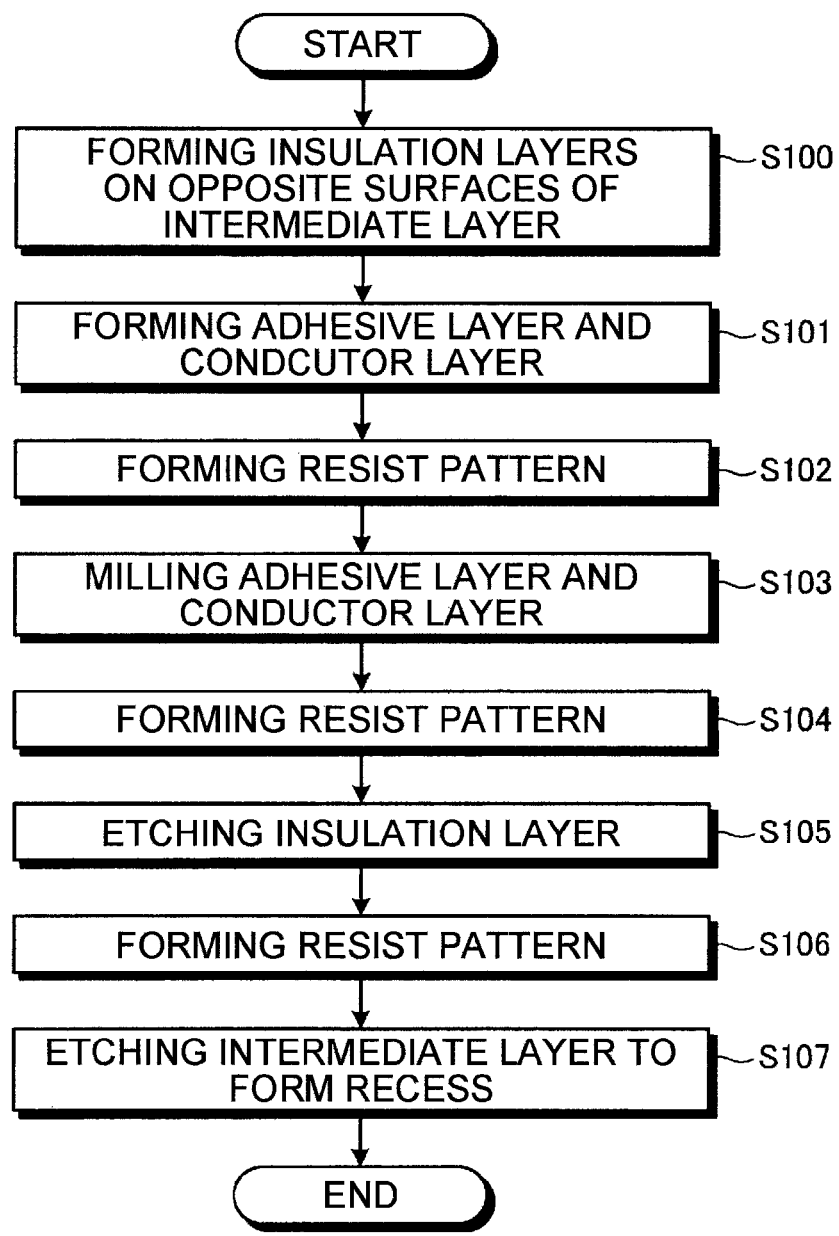
FIG. 4 is a flowchart illustrating an exemplary manufacturing sequence of a sensor module in a first exemplary embodiment.
Figure 8:
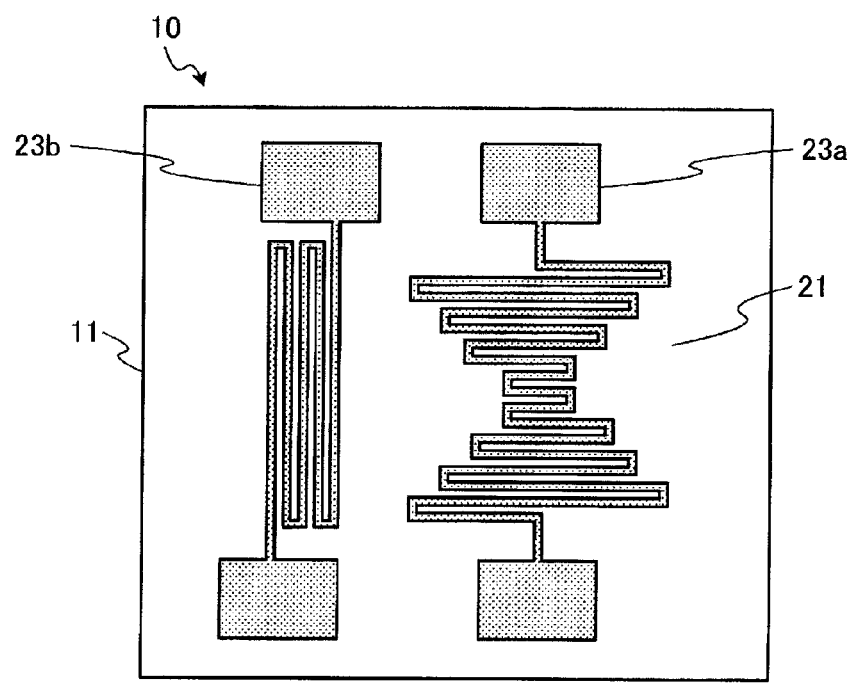
FIG. 8 is a plan view illustrating an exemplary resist pattern.
Figure 9:
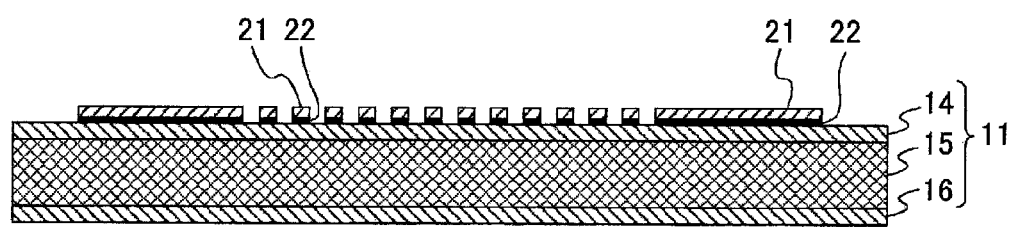
FIG. 9 is a cross-sectional view illustrating the exemplary sensor module in the process of manufacture.
Figure 10:
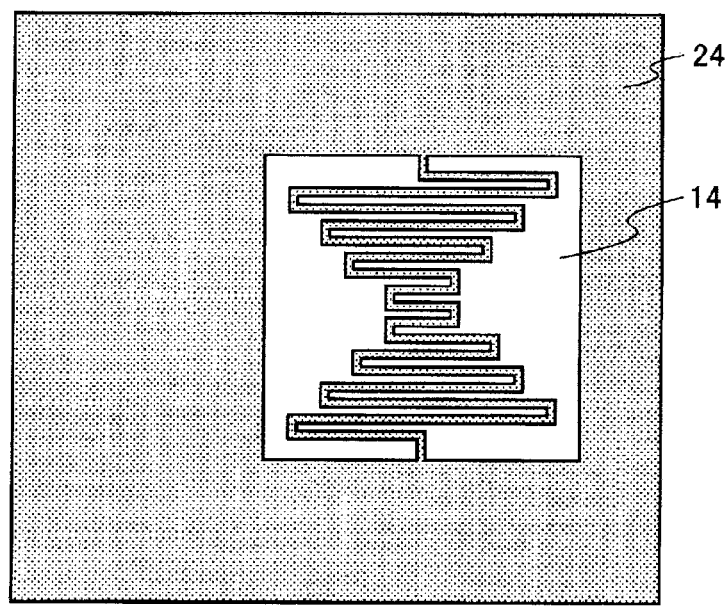
FIG. 10 is a plan view illustrating an exemplary resist pattern.

FIG. 4 is a flow chart illustrating an exemplary manufacturing sequence of a sensor module 10 in a first exemplary embodiment. FIGS. 5 to 7, FIG. 9, and FIG. 11 are cross-sectional views illustrating an exemplary sensor module 10 in the process of manufacture. FIGS. 8 and 10 are plan views illustrating exemplary resist patterns.

Figure 5:
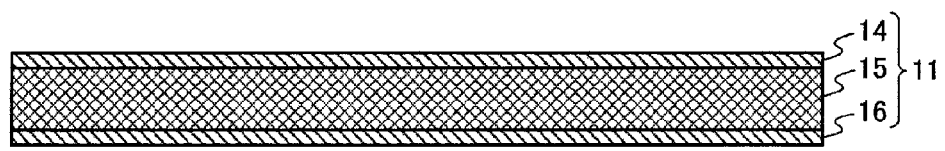
FIG. 5 is a cross-sectional view illustrating the exemplary sensor module in the process of manufacture.

First, an insulation layer 14 and an insulation layer 16 are formed through, for example, a plasma chemical vapor deposition (CVD) on an intermediate layer 15 formed of, for example, silicon (S100). In the present exemplary embodiment, for example, as illustrated in FIG. 5, the insulation layer 14 and the insulation layer 16 are formed on the opposite surfaces of the intermediate layer 15, respectively. The intermediate layer 15 has a thickness of 300 nm and is formed of silicon. Each of the insulation layer 14 and the insulation layers 16 has a thickness of, for example, 200 nm, and is formed of silicon nitride.

Figure 6:
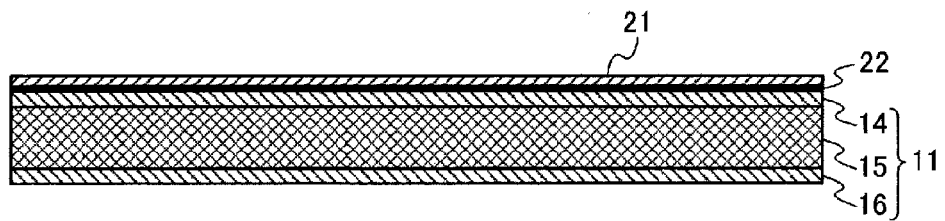
FIG. 6 is a cross-sectional view illustrating the exemplary sensor module in the process of manufacture.

Subsequently, on the insulation layer 14 formed at step S100, an adhesive layer 22 and a conductor layer 21 are formed through, for example, a sputtering (S101). In the present exemplary embodiment, the adhesive layer 22 and the conductor layer 21 are formed through a high-temperature sputtering under the temperature condition of, for example, 600° C. In the present exemplary embodiment, for example, as illustrated in FIG. 6, the adhesive layer 22 is formed of chromium on the insulation layer 14, and the conductor layer 21 is formed on the adhesive layer 22. The adhesive layer 22 has a thickness of 5 nm and is formed of chromium, and the conductor layer 21 has a thickness of 50 nm and is formed of platinum.

Figure 7:
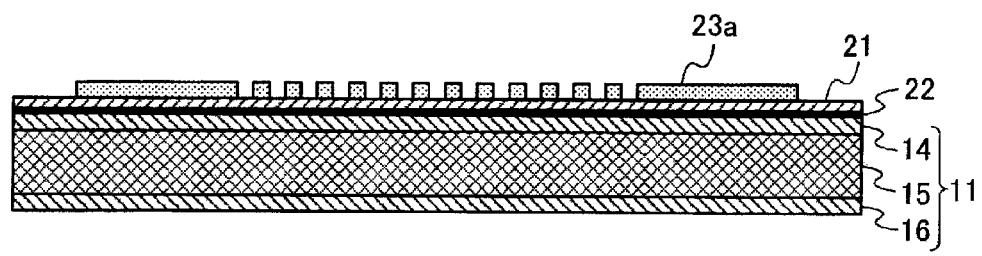
FIG. 7 is a cross-sectional view illustrating the exemplary sensor module in the process of manufacture.

Subsequently, a resist material is coated on the conductor layer 21 formed at step S101, and, for example, as illustrated in FIG. 7, a resist pattern 23a is formed on the conductor layer 21 through exposure and development (S102). The plan view of the resist pattern 23a and a resist pattern 23b formed on the conductor layer 21 may correspond to FIG. 8, for example.

Subsequently, the portions of the conductor layer 21 and the adhesive layer 22 which are not covered with the resist patterns 23a and 23b are removed through a milling by irradiation of, for example, argon ions (S103). Then, the resist patterns 23a and 23b are removed. As a result, for example, as illustrated in FIG. 9, the portions of the conductor layer 21 and the adhesive layer 22, which were covered with the resist patterns 23a and 23b at step S102, are left on the insulation layer 14.

Subsequently, on the conductor layer 21 formed at step S103, for example, as illustrated in FIG. 10, a resist pattern 24 for removing the insulation layer 14 between the recess 13 and the electric resistor 20 is formed (S104).

Figure 11:
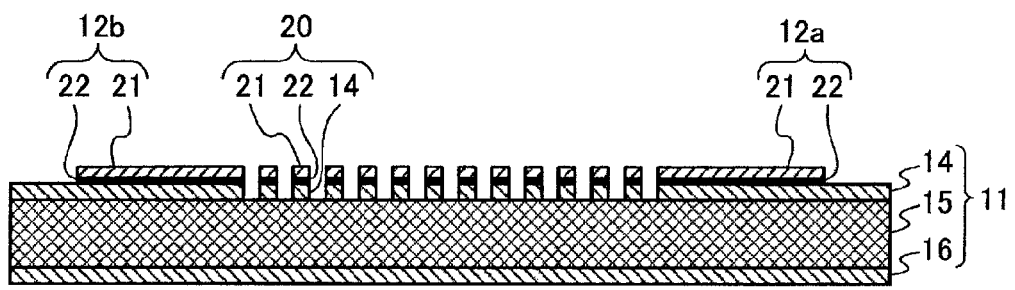
FIG. 11 is a cross-sectional view illustrating the exemplary sensor module in the process of manufacture.

Subsequently, the insulation layer 14 having the resist pattern 24 formed thereon is etched through, for example, a reactive ion etching (RIE) to form a fine wire pattern of the electric resistor 20 (S105). Then, when the resist pattern 24 is removed, the substrate 11 has a cross section, for example, as illustrated in FIG. 11.

Figure 12:
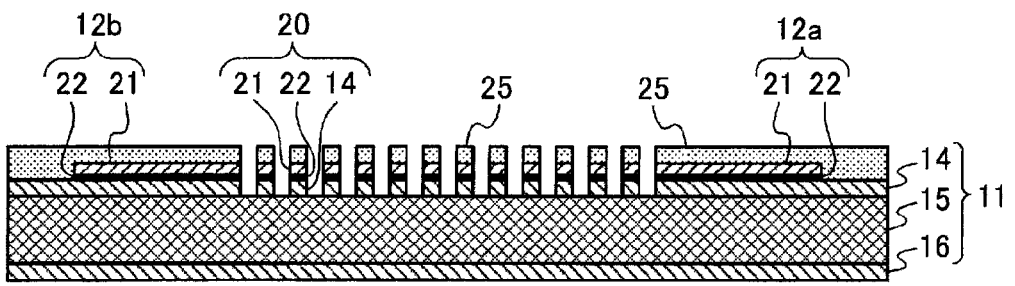
FIG. 12 is a cross-sectional view illustrating the exemplary sensor module in the process of manufacture.

Subsequently, as illustrated in FIG. 12, a resist pattern 25 for removing the intermediate layer 15 between the recess 13 and the electric resistor 20 is formed (S106). Then, the substrate 11 having the resist pattern 25 formed thereon is immersed in a chemical liquid such as, for example, tetra methyl ammonium hydroxide (TMAH) so that the intermediate layer 15 on the bottom surface of the electric resistor 20 is etched in a depth of about 100 μm to form the recess 13 (S107). As a result, the intermediate layer 15 on the bottom surface of the electric resistor 20 is removed, and thus, the sensor module 10 having a cross section, for example, as illustrated in FIG. 2, is formed.

Film Quality of Conductor Layer 21

In the manufacturing method of the sensor module 10 of the present exemplary embodiment, at step S101, the adhesive layer 22 and the conductor layer 21 are formed through a sputtering under the temperature condition of, for example, 600° C. Here, assuming that the conductor layer 21 is formed through a normal-temperature sputtering, an atom that has reached the insulation layer 14 hardly grows into a crystal nucleus since the deposition temperature is low. Thus, the conductor layer 21 formed through the normal-temperature sputtering becomes a film having small crystals and a lot of voids.

Figure 13:
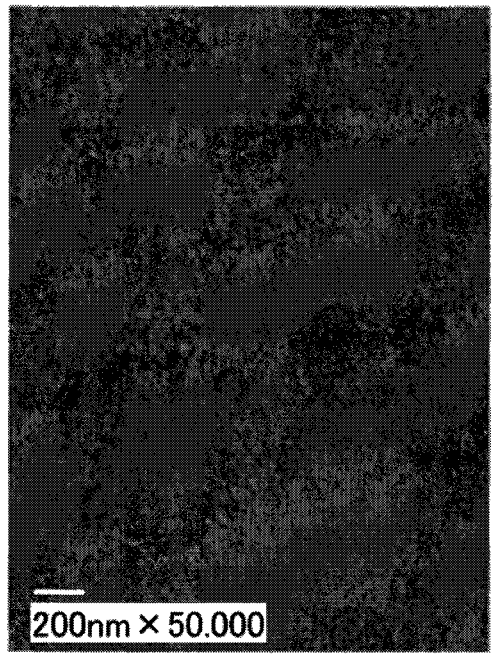
FIG. 13 is a view illustrating an exemplary SEM image of a conductor layer that was formed through a normal-temperature sputtering.

FIG. 13 is a view illustrating an exemplary SEM image of a conductor layer 21 that was formed through a normal-temperature sputtering. As illustrated in FIG. 13, the conductor layer 21 formed through a sputtering under the temperature condition of a normal temperature (e.g., 50° C. or less) has small crystals and a lot of voids. In addition, when a current is input to the electric resistor 20 formed by etching the conductor layer 21 formed through the normal-temperature sputtering, the voids in the conductor layer 21 grow, and thus, the resistance of the electric resistor 20 is changed. When the current flowing in the conductor layer 21 is increased, the growth of the voids in the conductor layer 21 is also increased, and thus, the amount of the resistance change is also increased.

Here, in the pressure sensor using the principle of the Pirani vacuum gauge, the pressure of the gas is determined from the temperature change caused in the electric resistor as a heat quantity is taken out by the gas. Thus, in order to increase the temperature change of the electric resistor, it is necessary to generate heat so that the conductor layer 21 has a somewhat high temperature. For this purpose, it is necessary to input a relatively large current of, for example, several mA (e.g., 2.4 mA in the present exemplary embodiment), to the adhesive layer 22 and the conductor layer 21.

When the current flowing in the conductor layer 21 is increased, the growth of the voids within the metal film is also increased, and as a result, the amount of the resistance change is also increased. Thus, in the case where the conductor layer 21 formed through a normal-temperature sputtering is used, the pressure of the gas may not be precisely determined since the resistance of the conductor layer 21 may also be changed even by a factor other than the pressure of the gas.

Thus, in the present exemplary embodiment, at step S101, the adhesive layer 22 of chromium and the conductor layer 21 of platinum are formed through a high-temperature sputtering under the temperature condition of, for example, 600° C. or more. In the present exemplary embodiment, since the conductor layer 21 is formed through the high-temperature sputtering under the temperature condition of a relatively high temperature, a metal atom that has reached the substrate easily grows into a crystal nucleus. Thus, the conductor layer 21 formed through the high-temperature sputtering becomes a film that has large crystals and few voids.

Figure 14:
FIG. 14 is a view illustrating an exemplary SEM image of a conductor layer that was formed through a high-temperature sputtering.

FIG. 14 is a view illustrating an exemplary SEM image of a conductor layer 21 that was formed through a high-temperature sputtering. FIG. 14 is an exemplary SEM image of a conductor layer 21 that was through the high-temperature sputtering under the temperature condition of 600° C. As illustrated in FIG. 14, the conductor layer 21 formed through the high-temperature sputtering has larger crystals and fewer voids as compared to the conductor layer 21 of FIG. 13 which was formed through the normal-temperature sputtering.

Thus, when a current is input to the electric resistor 20 formed by etching the conductor layer 21 formed through the high-temperature sputtering, the growth of the voids within the conductor layer 21 is small and the change of the volume resistivity is also small. Thus, in the case where the conductor layer 21 formed through the high-temperature sputtering is used, most of the change of the resistance becomes the change according to the pressure of the gas, which may improve the precision of measuring the pressure of the gas.

In addition, when the crystals within the conductor layer 21 grow largely due to the high-temperature sputtering, the crystal grain boundaries also grow largely. When the crystal grain boundaries are increased, the temperature coefficient of resistance (TCR) is increased. In the pressure sensor using the principle of the Pirani vacuum gauge, the pressure of the gas is determined based on the temperature change caused in the electric resistor 20 as the heat quantity is taken out by the gas. Thus, as the TCR of the conductor layer 21 is increased, the change amount of the electric resistance in relation to the temperature change of the electric resistor 20 is increased, which may improve the precision of measuring the pressure of the gas.

In the conductor layer 21 of FIG. 13 which was formed through the normal-temperature sputtering, the TCR value was 0.0924%. Meanwhile, in the conductor layer 21 of FIG. 14 which was formed through the high-temperature sputtering in the present exemplary embodiment, the TCR value was 0.3709%. In view of the fact that the TCR of bulk platinum is 0.38%, the TCR having a value close to that of the bulk platinum may be achieved through the high-temperature sputtering. Thus, when the conductor layer 21 is formed through the high-temperature sputtering, the TCR of the conductor layer 21 may be increased so that the precision of measuring the pressure of a gas may be further improved.

Meanwhile, at step S101, the conductor layer 21 is formed through the sputtering under the temperature condition of 600° C. However, the sputtering temperature condition may be, for example, 300° C. or more. However, when the temperature during the sputtering is excessively high, any other metal member that constitutes the sensor module 10 may be molten and agglutinated. Thus, the sputtering temperature condition at step S101 may range from 300° C. to 1000° C. More particularly, the sputtering temperature condition at step S101 may range from 300° C. to 600° C.

In the foregoing, the first exemplary embodiment has been described. According to the sensor module 10 of the present exemplary embodiment, the precision of measuring the pressure of a gas may be improved.

Second Exemplary Embodiment

Subsequently, a second exemplary embodiment will be described. In the second exemplary embodiment, the processes of forming the adhesive layer 22 and the conductor layer 21 are different from those in the first exemplary embodiment. Meanwhile, except for the features described below, the structure of the sensor module 10 of the second exemplary embodiment is similar to that of the sensor module 10 in the first exemplary embodiment, and thus, detailed descriptions thereof will be omitted.

Manufacturing Sequence of Sensor Module 10

Figure 15:
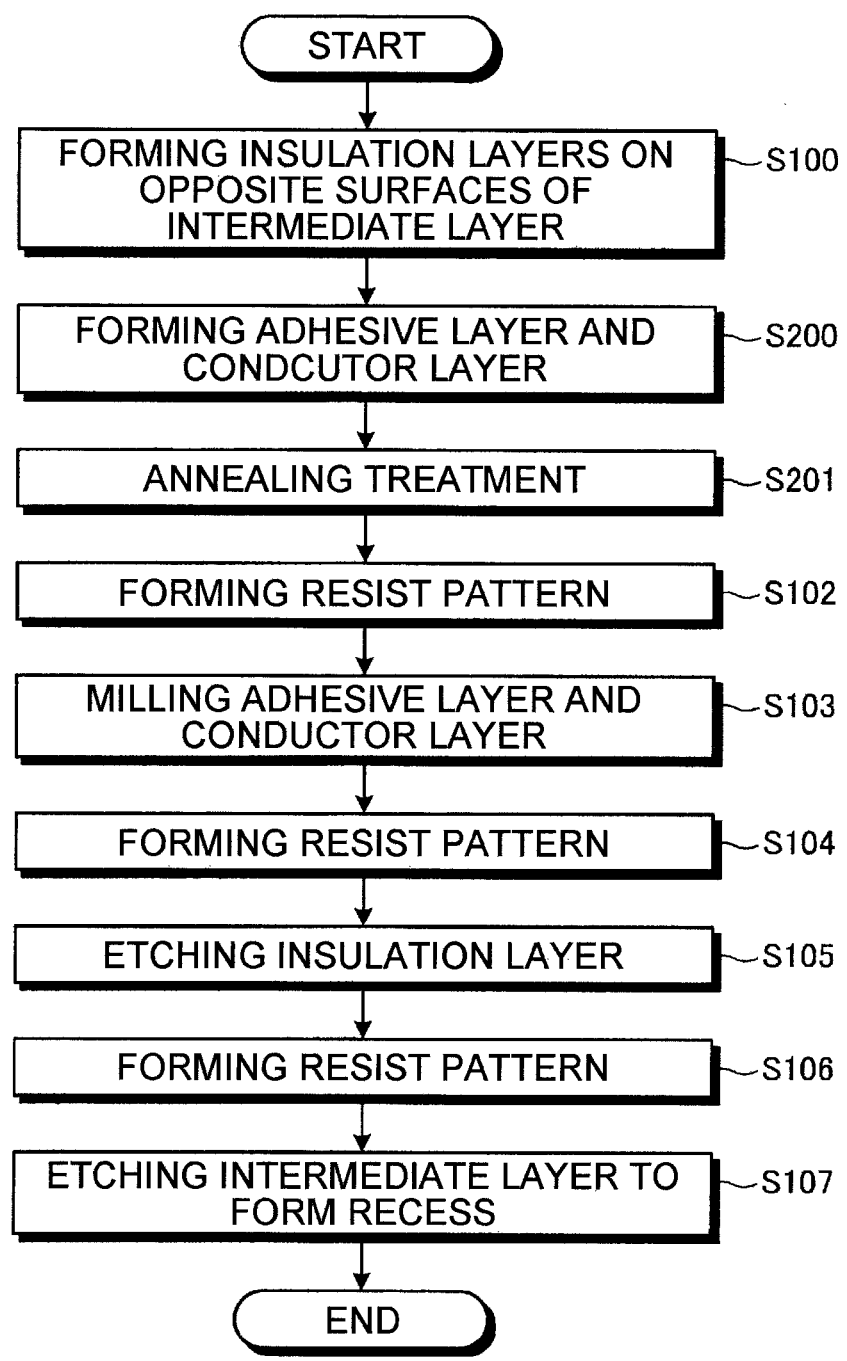
FIG. 15 is a flowchart illustrating an exemplary manufacturing sequence of a sensor module in a second exemplary embodiment.

FIG. 15 is a flowchart illustrating an exemplary manufacturing sequence of the sensor module 10 in the second exemplary embodiment. Meanwhile, in FIG. 15, except for the features described below, the steps indicated by the same symbols as the steps in FIG. 4 are the same as or similar to the steps in FIG. 4 and thus, detailed descriptions thereof will be omitted.

On the insulation layer 14 formed at step S100, an adhesive layer 22 and a conductor layer 21 are formed through, for example, a sputtering (S200). In the present exemplary embodiment, the adhesive layer 22 and the conductor layer 21 are formed through, for example, a sputtering under the temperature condition of a normal temperature (e.g., 50° C. or less).

Subsequently, an annealing treatment is performed on the substrate 11 with the adhesive layer 22 and the conductor layer 21 formed thereon at step S200, under the temperature condition of 600° C. to 1000° C. (S201). At step S201, the annealing treatment may be performed on the substrate 11 with the conductor layer 21 formed thereon, under the temperature condition of 1000° C. Thereafter, the processes of steps S102 to S107 are performed.

Film Quality of Conductor Layer 21

Figure 16:
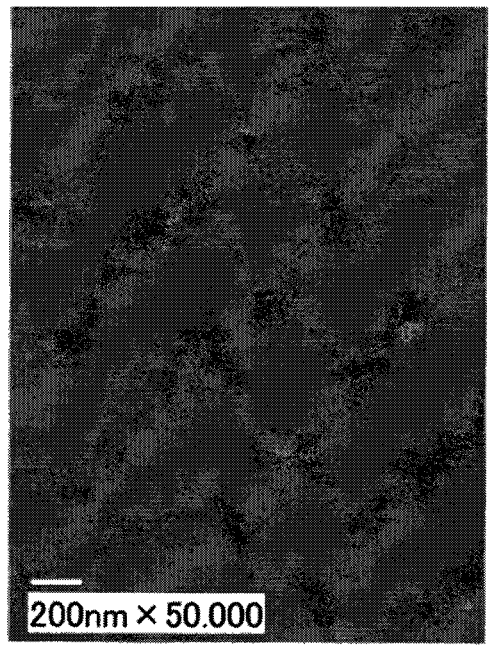
FIG. 16 is a view illustrating an exemplary SEM image of a conductor layer in a case where an annealing treatment was performed after the normal-temperature sputtering.

In the method of manufacturing a sensor module 10 of the present exemplary embodiment, at step S200, the adhesive layer 22 and the conductor layer 21 are formed through a normal-temperature sputtering. Then, at step S201, an annealing treatment is performed on the substrate 11 with the adhesive layer 22 and the conductor layer 21 formed thereon, under the temperature condition of 600° C. to 1000° C. FIG. 16 illustrates an exemplary SEM image of a conductor layer 21 in the case where the annealing treatment was performed after the normal-temperature sputtering.

As illustrated in FIG. 16, the conductor layer 21, which was subjected to the annealing treatment at a predetermined temperature after the normal-temperature sputtering, has larger crystals and fewer voids as compared to the conductor layer 21 of FIG. 13 which was formed through the normal-temperature sputtering. Thus, when a current is input to the electric resistor 20 formed by etching the conductor layer 21 subjected to the annealing treatment at a predetermined temperature after the normal-temperature sputtering, the growth of the voids within the conductor layer 21 is small and the resistance change is also small. Thus, when the conductor layer 21 subjected to the annealing treatment at a predetermined temperature after the normal-temperature sputtering is used, most of the resistance change becomes the change according to the pressure of a gas, which may improve the precision of measuring the pressure of a gas.

In the conductor layer 21 of FIG. 16 which was subjected to the annealing treatment at a predetermined temperature after the normal-temperature sputtering, the TCR value was 0.310%. The TCR value of the conductor 21, on which no annealing treatment was performed after the normal-temperature sputtering, was 0.0924%. Thus, when the annealing treatment is performed at a predetermined temperature after the normal-temperature sputtering, the TCR value may be increased. As a result, the precision of measuring the pressure of a gas may be further improved.

In the foregoing, the second exemplary embodiment has been described.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for manufacturing a pressure sensor that generates heat through an electric resistor adapted to be exposed to a gas, and outputs a temperature change caused in the electric resistor according to a pressure of the gas, as a resistance change of the electric resistor, the method comprising:
    forming a first film on a substrate, the first film being an oxide film or a nitride film; and
    forming a second film on the first film under a temperature condition of 300° C. to 600° C., the second film being configured to serve as the electric resistor.

2. A method for manufacturing a pressure sensor that generates heat through an electric resistor adapted to be exposed to a gas, and outputs a temperature change caused in the electric resistor according to a pressure of the gas, as a resistance change of the electric resistor, the method comprising:
    forming a first film on a substrate, the first film being an oxide film or a nitride film;
    forming a second film on the first film under a temperature condition of 50° C. or less, the second film being configured to serve as the electric resistor; and
    performing an annealing treatment on the second film formed on the first film under a temperature condition of 600° C. to 1000° C.

3. The method of claim 1, wherein the second film is formed of a metal containing platinum or nickel.

4. The method of claim 1, wherein the substrate is formed of silicon, and the first film is formed of silicon nitride.

5. A pressure sensor that generates heat through an electric resistor adapted to be exposed to a gas, and outputs a temperature change caused in the electric resistor according to a pressure of the gas, as a resistance change of the electric resistor,
    wherein the pressure sensor is manufactured by a manufacturing method comprising:
    forming a first film on a substrate, the first film being an oxide film or a nitride film; and
    forming a second film on the first film under a temperature condition of 300° C. to 600° C., the second film being configured to serve as the electric resistor.

6. A pressure sensor that generates heat through an electric resistor adapted to be exposed to a gas, and outputs a temperature change caused in the electric resistor according to a pressure of the gas, as a resistance change of the electric resistor,
    wherein the pressure sensor is manufactured by a manufacturing method comprising:
    forming a first film on a substrate, the first film being an oxide film or a nitride film;
    forming a second film on the first film under a temperature condition of 50° C. or less, the second film being configured to serve as the electric resistor; and
    performing an annealing treatment on the second film formed on the first film under a temperature condition of 600° C. to 1000° C.

* * * * *